United States Patent [19]
Meyer

[11] 3,919,780
[45] Nov. 18, 1975

[54] LENGTH-MEASURING INSTRUMENT
[76] Inventor: Hans Meyer, Bugnon, 24, Renens, Vaud, Switzerland
[22] Filed: June 18, 1974
[21] Appl. No.: 480,507

[30] Foreign Application Priority Data
June 22, 1973 Germany............................ 2332519

[52] U.S. Cl. ............................. 33/172 B; 33/169 R
[51] Int. Cl.² ......................................... G01B 3/22
[58] Field of Search .......... 33/148 R, 169 R, 172 B, 33/172 R

[56] References Cited
UNITED STATES PATENTS
1,702,455  2/1929  Trumpler ......................... 33/172 B
2,395,130  2/1946  Litman ............................. 33/172 B
3,464,118  9/1969  Nagata ............................. 33/172 B Primary Examiner—Richard E. Aegerter
Assistant Examiner—Richard R. Stearns
Attorney, Agent, or Firm—Emory L. Groff, Jr.

[57] ABSTRACT

A small-bulk highly accurate instrument indifferent to external disturbances, comprising a torsional arrangement constituted by a lever-controlled rotary body rigid with the means controlling the indicator mechanism and associated with a hub-carrying spindle extending axially within said body and rigid with the instrument case, the connection between the body and the case being ensured by at least three radial blade springs the transverse edges of which are held fast respectively in the hub and in the bottom of the rotary body.

5 Claims, 2 Drawing Figures

LENGTH-MEASURING INSTRUMENT

My invention has for its object a length-measuring instrument and more particularly calipers of the so-called lever-controlled type.

Lever-controlled calipers are already known wherein the feeler lever to which the feeler pin is secured is fitted in pin bearings. For usual requirements, such bearings are sufficient, but if greater accuracy is necessary, they are no longer practical since it is impossible to eliminate the clearances in the bearings unless objectionable frictional resistances are introduced.

Therefore, other known embodiments aim at fitting the feeler lever in miniature ball bearings which can be adjusted so as to reduce the clearances to the utmost. Beyond the fact that such bearings are expensive, they cannot provide a complete elimination of their drawbacks which are chiefly ascribable to the geometrical structure of ball bearings. The assembly without any clearance of such ball bearings is furthermore a difficult matter since even slight external forces such as those produced by a shock may lead to a defective positioning of the parts.

Similarly, the so-called diagonal bearings incorporated with length-measuring instruments operate under excellent conditions without any substantial clearance, but they are not suitable when a very small bulk is desired for the assembly, which is the case for the lever-controlled calipers referred to.

My improved measuring instrument removes these drawbacks and it is characterized to this end by a connection between the feeler lever and the case of the instrument which comprises at least three springs distributed annularly around the pivotal axis of said feeler lever and extending in parallelism with said axis, the resultant radial bending stress of the spring system being larger than its resultant axial torsional stress.

Such an assembly according to the invention ensures a positioning without any clearance in the bearing and without any friction whereby the above-mentioned drawbacks of the prior arrangements are removed. In contra-distinction with the above referred to diagonal bearings used in conventional instruments, my improved assembly shows the advantage of being, if required, reduced to a comparatively small bulk, which is highly advantageous chiefly in the case of lever-controlled calipers. A further advantage of the novel arrangement according to the invention consists in that, in spite of the small bulk of the bearing, it is possible to provide it with comparatively long blade springs, whereby the internal torque opposing the measuring force may assume a very low value.

According to a further feature of my invention, means are provided for eliminating any risk of overloading the spring system by suitably limited clearances with a view to protecting the springs against unexpected external action such as that produced by shocks.

I shall now disclose my invention with further detail, reference being made to the accompanying drawings wherein.

Figure 1:
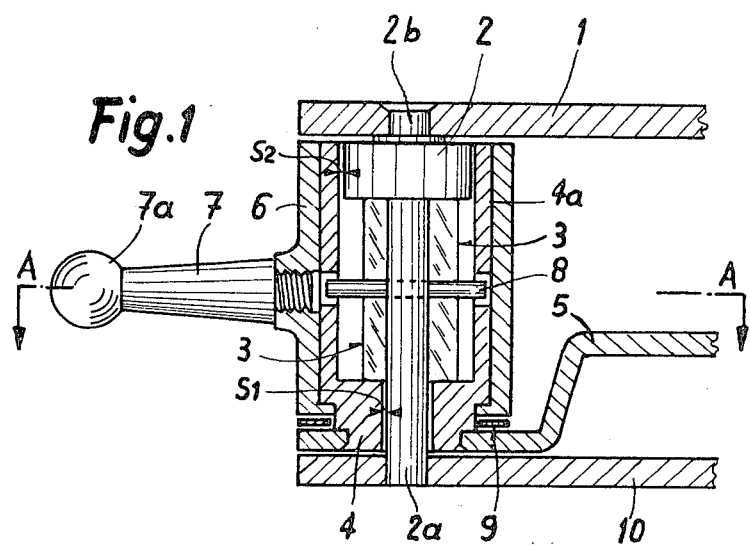
FIG. 1 is a cross-section of one embodiment of my improved bearing carrying the feeler lever of lever-controlled calipers.
Figure 2:
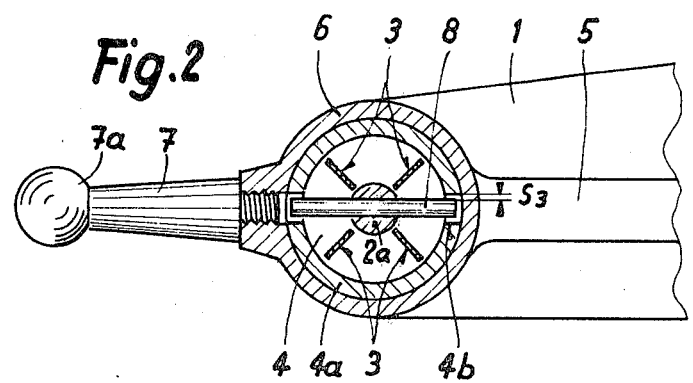
FIG. 2 is a cross-section of the same bearing along line A—A of FIG. 1.

FIGS. 1 and 2 illustrate the case 1 of a lever-controlled indicator, wherein a spindle 2a carrying a hub 2 is riveted through one end 2b to the case whereas its opposite end 2 is set in the cover 10 of the case. A body 4 is fitted coaxially over the hub 2 and is operatively connected with the spindle by means of four flat radially extending springs 3 the terminal edges of which are held in cooperating radial grooves provided respectively in the hub 2 and in the bottom of the body 4. Said flat springs are distributed uniformly round the hub-carrying spindle and extend in parallelism with the latter.

For structural reasons, it is preferable to use four springs 3, but obviously three or more than four springs may be provided.

The hub 2, the body 4 and the springs 3 form together a torisional system the stator of which is constituted by the hub 2 while the rotor is constituted by the body 4. In order to reduce to a minimum the resistance against twisting while retaining a resistance against bending which is as high as possible in a direction at right angles with the axis of the system, it is of advantage to select springs 3 the breadth of which is as large as possible with referennce to their thickness.

The springs 3 are secured to the hub 2 and to the bottom of the body 4 by any suitable means such as riveting, welding or gluing. According to a further possibility, the body 4, springs 3 and hub 2 may be formed as a single part.

Around the body 4 is revolvably fitted a sleeve 6 to which the feeler lever 7 is threadedly connected, said lever terminating outwardly with a controlling ball handle 7a. Said sleeve 6 rests axially, with the interposition of a friction spring 9 on the lever 5 controlling the indicator mechanism, said lever 5 being secured to the body 4 by rivets. The spring 9 is designed in accordance with usual practice in a manner such that the sleeve 6 skids with reference to the body 4 as soon as the torque exerted by the lever 7 rises above a predetermined limit value. In order to prevent the springs 3 from being exaggeratedly stressed torsionally, a pin 8 crossing the spindle is limited as to its angular shifting by the engagement of its ends against either side of the openings 4b formed in the body 4, so as to receive said pin ends with a certain clearance $S_3$. Similarly, in order to prevent the springs 3 from being subjected to an exaggerated bending stress in a direction perpendicular to the rotary axis of the system, there are provided between the hub and the spindle carrying it on the one hand, and the body 4 on the other, small clearances as shown at $S_2$ and $S_1$ in order to limit the allowed extent of bending.

The lever 5 controls in the conventional manner the indicator mechanism which is not illustrated.

I Claim:

1. Lever-controlled calipers comprising a stationary case, a cylindrical body rotatably mounted inside said case, said body having an axial hollow opening therein, a feeler lever radially carried by said body, a further lever rigid with said body, an indicator mechanism controlled by said further lever, a torsion-resisting connection between the case and the body, including means extending axially within said body opening and rigid with said case, at least three springs within the body opening and distributed around said means, each of said springs attached to both said last-mentioned means and said rotatably mounted body, the resistance of the springs against radial bending being larger than their resistance against axial twisting.

2. Lever-controlled calipers according to claim 1, including means limiting the relative rotation of the body with reference to the case.

3. Lever-controlled calipers according to claim 1, including a sleeve fitted coaxially over the cylindrical body, said sleeve frictionally coupled with said body and rigid with said feeler lever.

4. Lever-controlled calipers according to claim 1 wherein the body opening includes an upper portion and a lower portion, said means includes a spindle extending axially within the body opening, a hub rigid with said spindle at one end thereof and disposed within the upper portion of said opening, said springs comprising blade springs extending longitudinally parallel to the axis of said spindle, the ends of said springs being secured respectively to the hub and to the lower portion of the body.

5. Lever-controlled calipers according to claim 4 wherein said spindle and said hub are each spaced from said body.

* * * * *